(12) United States Patent
Appleby

(10) Patent No.: US 6,463,404 B1
(45) Date of Patent: Oct. 8, 2002

(54) TRANSLATION

(75) Inventor: Stephen C Appleby, Colchester (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 09/180,182

(22) PCT Filed: Aug. 7, 1998

(86) PCT No.: PCT/GB98/02389

§ 371 (c)(1),
(2), (4) Date: Nov. 2, 1998

(87) PCT Pub. No.: WO99/08202

PCT Pub. Date: Feb. 18, 1999

(30) Foreign Application Priority Data

Aug. 8, 1997 (EP) .............................. 97306057

(51) Int. Cl.[7] ........................... G06F 17/27; G06F 17/28
(52) U.S. Cl. ................................. 704/9; 704/2
(58) Field of Search ....................... 704/1–10

(56) References Cited

U.S. PATENT DOCUMENTS

| 5,418,717 | A | * | 5/1995 | Su et al. | 704/7 |
|---|---|---|---|---|---|
| 5,490,061 | A | * | 2/1996 | Tolin et al. | 704/2 |
| 5,523,956 | A | * | 6/1996 | Kaplan et al. | 704/9 |
| 5,528,491 | A | * | 6/1996 | Kuno et al. | 704/7 |
| 5,535,120 | A | * | 7/1996 | Chong et al. | 704/2 |
| 6,139,201 | A | * | 10/2000 | Carbonell et al. | 704/9 |

* cited by examiner

Primary Examiner—Patrick N. Edouard
(74) Attorney, Agent, or Firm—Nixon & Vanderhye PC

(57) ABSTRACT

Apparatus for use within a system for translating a document from a source language to at least one target language, comprising means for parsing said document using grammar rules specific to said source language, to derive a source language semantic structure; means for processing said source language semantic structure, to detect the presence therein of semantic elements which are specific to said source language, and to replace said semantic elements with replacement elements which are generic to a plurality of possible said target languages, to generate a generic semantic representation of said document.

4 Claims, 7 Drawing Sheets

TRANSLATION

BACKGROUND OF THE INVENTION

This invention relates to automatic language translation.

Machine language translators accept input text in a first natural language (the source language) and generate corresponding output text in a second natural language (the target language). Such translators may be classified into two types; those which use a set of translation rules for each possible pair of source and target languages, and those (relatively rare) interlingual systems which translate from the source language into a language independent (interlingual) form, and then from this language independent form to the target language.

The former system has the disadvantage that as the number of languages rises, the number of sets of translation rules rises as the square of the number of languages. The latter approach is difficult to implement, and can result in unnatural translations, for example with loss of appropriate emphases.

A prior art document describing an automatic translation system in which translation into an interlingual form is proposed in J M VAN ZUILEN: "Het automatisch vertaal-system DLT" INFORMATIE, vol. 32, no. 2, February 1990, DEVENTER, NL, pages 183–191, XP000406044. This document proposes the use of Esperanto, which is a natural language, as the interlingual form. However, when an interlingual form is ambiguous in relation to the target language (s), which will be the case when a natural language is used as the interlingual form, the interlingual form itself cannot be relied upon to provide a complete translation into the target language.

SUMMARY OF THE INVENTION

According to one aspect, the present invention provides a machine translation system utilising the interlingual approach (i.e. generating a generally language independent intermediate structure) in which modifiers (e.g. descriptive words or linguistic structures) which are capable, in the source language, of occupying more than one position are analysed and the position occupied is recorded. This enables adverbs or adjectives which have been placed in an unusual position for stress or emphasis to be translated into correspondingly stressed or emphasised descriptive terms in the target language.

In another aspect, the present invention provides a machine translation system for translating between a plurality of languages, in which grammar rules specific to the source language are applied to generate a semantic structure corresponding to the input text, and then semantic structures therein which are not shared by one or more of the target languages are detected and replaced with more generic structures, to generate an interlingual structure. This replacement will be referred to later in this document as "abstracting". This aspect also provides such a translator in which the interlingual structure is tested for the presence of such generic structures which have specific versions within the target language not shared by the source or other languages, and such structures are replaced by the specific structures for the target language, the amended structure thus produced being used to generate target language text.

In another aspect, a machine translation system provides an interlingual form which is unambiguous in relation to all of the target languages the system is able to translate into, in the sense that the interlingual form corresponds directly, preferably uniquely, to a language-specific semantic structure in each of the target languages. Where a semantic structure in the source language text is itself ambiguous in relation to the interlingual form, a plurality of alternative interlingual structures may be selected between by interaction with the user in order to provide disambiguation in accordance with the meaning of the source language structure intended by the user.

In another aspect, the present invention provides a machine translation system utilising a generally interlingual approach, in which the process of converting from the source language to the language independent representation involves a user-interactive disambiguation process which takes account of the target language(s), to avoid the unnecessary disambiguation of linguistic elements which are common to the source and target languages.

This can significantly reduce the amount of interaction required by the user. It may also reduce the complexity of the abstracting process by which each source language is transformed into the language independent representation, which would otherwise involve an increasing number of transformations or rules with the number of target languages; although such rules must be present, only a subset of the rules need be used in any given translation process.

In yet another aspect, the invention provides a multilingual messaging system in which a message is transmitted from a first processor to one or more destination processors via a telecommunications channel, in the form of an interlingual semantic representation of the message.

Other aspects and preferred embodiments are as described in the following description and claims.

BRIEF DESCRIPTION OF THE DRAWINGS

Embodiments of the invention will now be illustrated, by way of example only, with reference to the accompanying drawings, in which.

DETAILED DESCRIPTION OF THE INVENTION

First Embodiment

Figure 1:
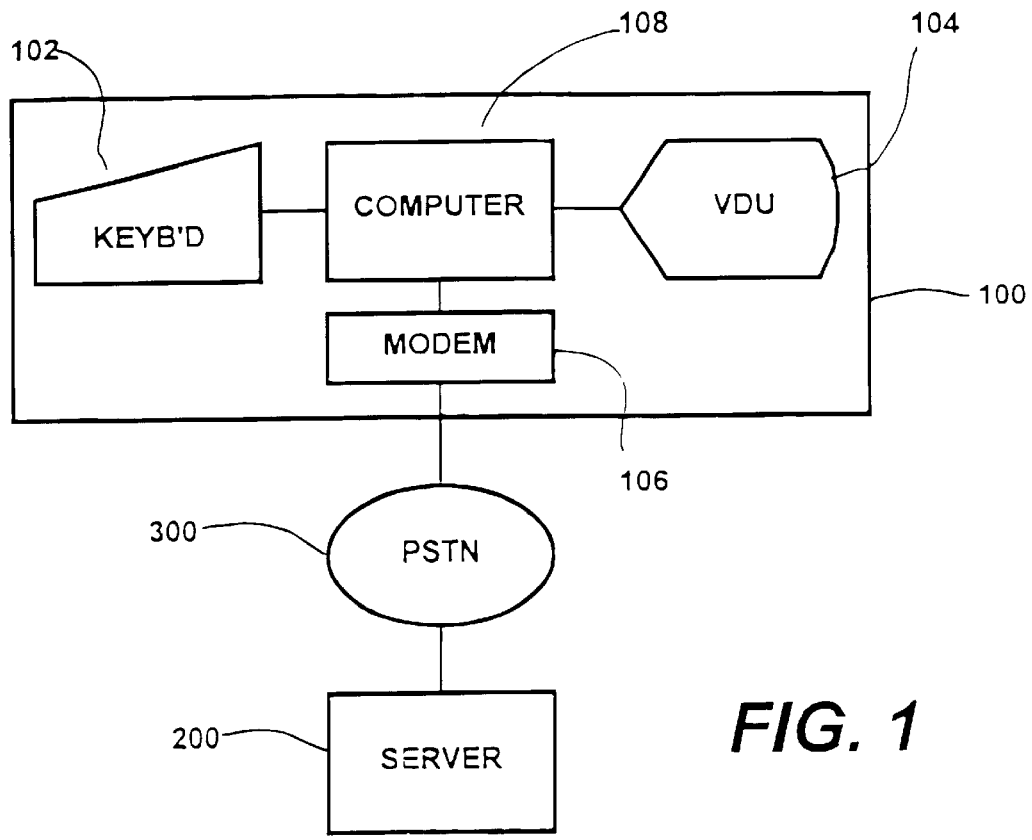
FIG. 1 is a block diagram of the language translation apparatus according to a first embodiment.

Referring to FIG. 1, the present invention may be employed by a client terminal 100 connected via a telecommunications network 300 such as the Public Switched Telephone Network (PSTN) to a server computer 200. The terms "client" and "server" in this embodiment are illustrative but not limiting to any particular architecture or functionality.

The client terminal comprises a keyboard 102, a VDU 104, a modem 106, and a computer 108 comprising a processor, mass storage such as a hard disk drive, and working storage, such as RAM. For example, a SUN™ work station or a Pentium™ personal computer may be employed as the client terminal 100.

Figure 2:
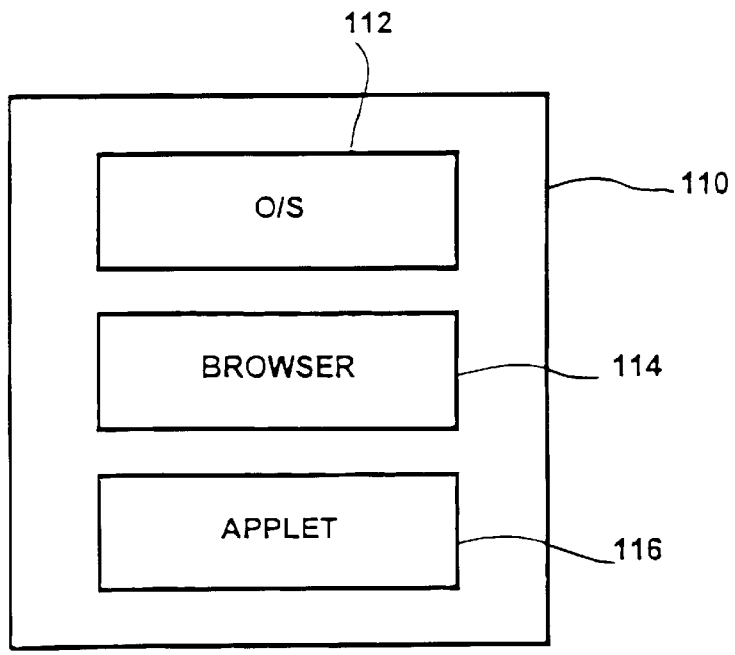
FIG. 2 is a block diagram showing in greater detail the processes present in a client terminal forming part of the embodiment of FIG. 1.

Stored within the client terminal (e.g. on the hard disk drive thereof) is an operating control program 110 comprising an operating system 112 (such as Windows™), a browser 114 such as Windows Explorer™ Version 3) and an application designed to operate with the browser 114, termed an applet, 116, as shown in FIG. 2. The function of the operating system is conventional and will not be described further. The function of the browser 114 is to interact, in known fashion, with hypertext information received from the server 200 via the PSTN 300 and modem 106. The browser 114 thereby downloads the applet 116 at the beginning of the communications session, as part of a hypertext document from the server 200. The function of the applet 116 is to control the display of received information, and to allow the input of information for uploading to the server 200 by the user, through the browser 114.

Figure 3:
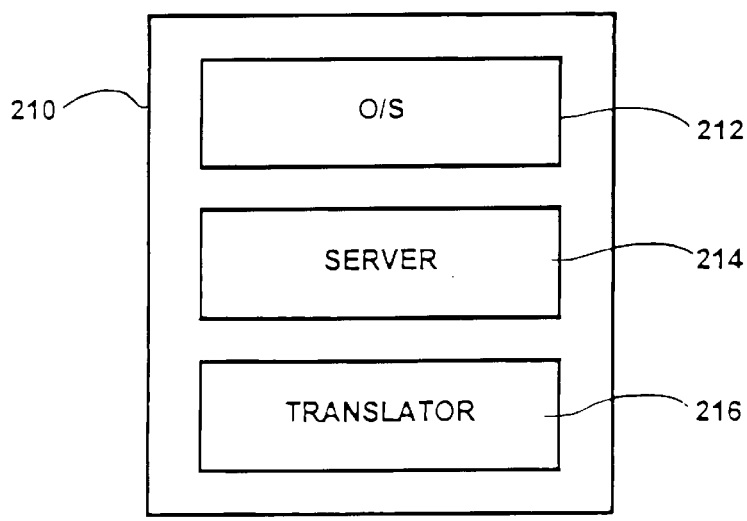
FIG. 3 is a block diagram showing in greater detail the processes present in a server forming part of the embodiment of FIG. 1.

Referring to FIG. 3, the server 200 comprises an operating program 210 comprising an operating system 212 such as Unix™, a server program 214 and a translator program 216. The operating system is conventional and will not be described further. The function of the server program 214 is to receive requests for hypertext documents from the client terminal 100 and to supply hypertext documents in reply. Specifically, the server program 214 initially downloads a document containing the applet 116 for the client terminal 100. The server program 214 is also arranged to supply data to and receive data from the translator program 216, via, for example, a cgi.bin mechanism.

The function of the translator program 216 is to receive text from the client terminal 100 via the telecommunications network 300 and server program 214; to interact with the user as necessary in order to clarify the text; and to produce a translation of the text for supply back to the user (in this embodiment).

Figure 4:
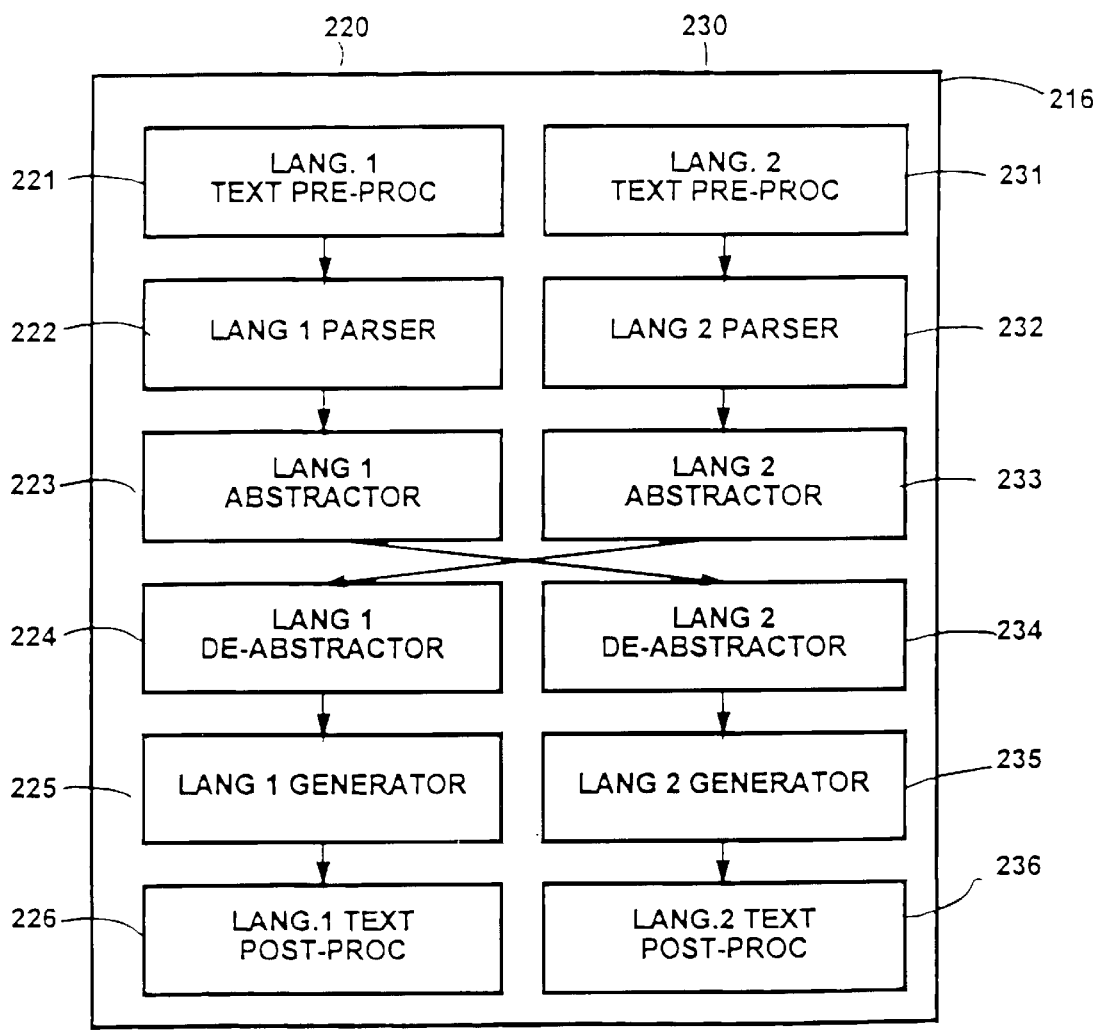
FIG. 4 is a block diagram showing in greater detail the subprocesses present within a translation process forming part of the embodiment of FIG. 3.

FIG. 4 shows the component programs of the translator 216. It comprises a number of sections; one for each language, of which only a first section 220, relating to a first language (LANG1) and a second section 230 relating to a second language (LANG2), are shown for clarity. Each language section comprises the following subprograms or modules:

1) A text pre-processor (221, 231)
2) A source language parser (222, 232)
3) A source language abstractor (223, 233)
4) A target language de-abstractor (224, 234)
5) A target language generator (225, 235)
6) A target language text post-processor (226, 236)

The functions of each of these components will be discussed in greater detail below.

Figure 5:
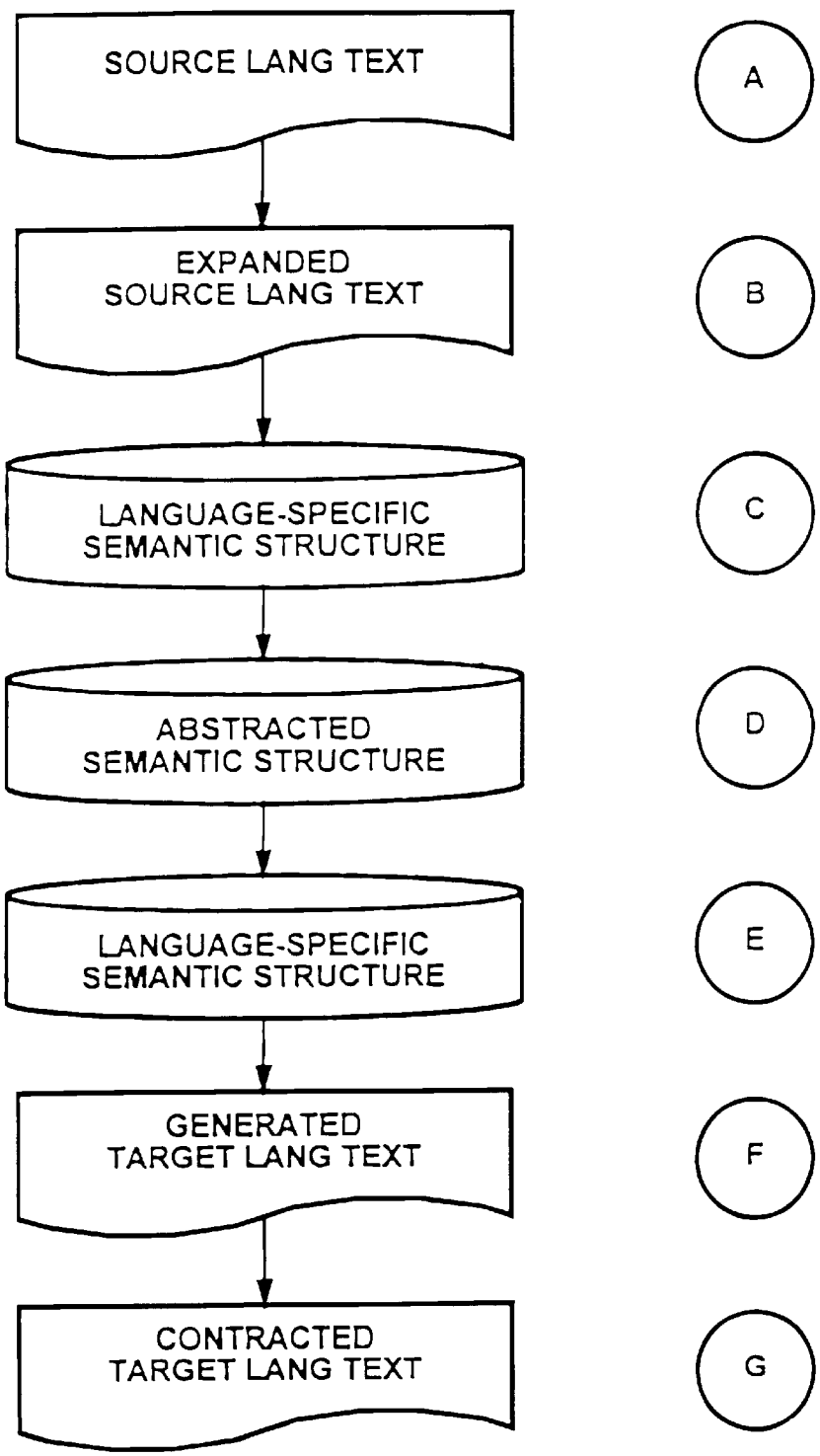
FIG. 5 is an illustrative diagram showing the formats through which text passes during the translation process of the embodiment of FIG. 1.

FIG. 5 illustrates the stages of translation according to this embodiment.

A source language text document (stage A) is received by the translator from the client terminal 100.

After operation of the text pre-processor stage (221), the result is an expanded source language text document (stage B). The operation of the preprocessor is to replace contracted forms of words (such as "he's" in English, or "j'ai" in French) with their non-contracted forms.

After operation of the source language parser 222, stage C of FIG. 5 is a language-specific semantic structure which represents the input text as an encoded entity-relationship graph, where the entities are semantic categories corresponding to the words (in other words, identifying the nouns, verbs and so on), and the relationships are data relating the entities together (e.g. to indicate those which are the subjects or objects of others).

After operation of the source language abstractor 223, the result is a further semantic structure D, similar to the language specific semantic structure produced at stage C but indicating additionally relationships and data which substitute the language-specific meanings of some of the structures represented within the semantic structure C with abstracted structures.

For example, a phrase such as "My name is David" input as source language text could be represented within a parsed semantic structure by data indicating ownership of the name by the individual first person, and an attribute of the name being that it is "David". This is a grammatically correct expression, from which French or German text could be generated by a suitable generator such as 235.

However, whilst grammatical French or German would be produced, the meaning would be unclear, since in French the equivalent phrase is "I call myself" ("je m'appelle") and in German the equivalent phrase is "Ich heiße" (which is equivalent to "I am called" in English, but for which English lacks a corresponding verb). Accordingly, the source language abstractor 223 recognises within the parsed semantic structure of the occurrence of structures which are not directly translatable, such as structures involving personal names in this example, and replaces those structures with additional data representing them.

Accordingly, the abstracted semantic structure produced at stage D of FIG. 5 corresponds to a representation of the input text but with the replacement of specific constructs which are known not to meaningfully translate into one or more other languages (whether or not those languages are represented by sections within the translator 216).

The abstracted semantic structure produced at stage D is an interlingual form which is unambiguous in relation to each of the target languages which the system is capable of translating into. That is to say that the interlingual form corresponds uniquely with a language-specific semantic structure in each of the target languages. As will be explained below, the text of the source language may itself include ambiguities which are not directly translatable into the interlingual form. Such ambiguities are dealt with in the parsing and abstracting process by generating a plurality of alternative structures in the interlingual form, the selection of the correct alternative structure being made by user interaction. Each of the alternative structures in the interlingual form may be de-abstracted and regenerated in the source language to allow the user to understand the alternatives being proposed. The result, either of the parsing and abstraction process or the parsing and abstraction process in combination with user input, is a single structure in the interlingual form which is entirely unambiguous in relation to the target languages.

The abstracted semantic structure, or a selected one of the abstracted semantic structures, produced by the abstractor in stage D is then passed to the de-abstractor 234 of the target language, which comprises a series of rules which test for the presence of the additional structures inserted by the language abstractor 223, and translate them into the form used in the target language. For instance, in the example given above, the abstracted naming operation would be converted, in French, into "je me appelle" (I call myself). The result is then, at stage E, a semantic structure equivalent to the language-specific semantic structure at stage C but in which the semantic substructures corresponding to phrases or expressions in the input text which would give rise to translation difficulties have been replaced by appropriate substructures in the target language. This structure forms the input to the target language generator 235, which generates a corresponding target language output text (stage F), and therefore applies the reverse process to the parsers 222, 232.

Finally, the generated output text at stage F is contracted by the text post-processor 236 which takes the generated text and contracts relevant parts of it. In the above example, "je me appelle David" would be contracted to "je m'appelle David". Other minor text processing operations, such as adding capital letters at appropriate places (for example at the beginning of each sentence), and providing the correct spacings between words, are also carried out.

Figure 6:
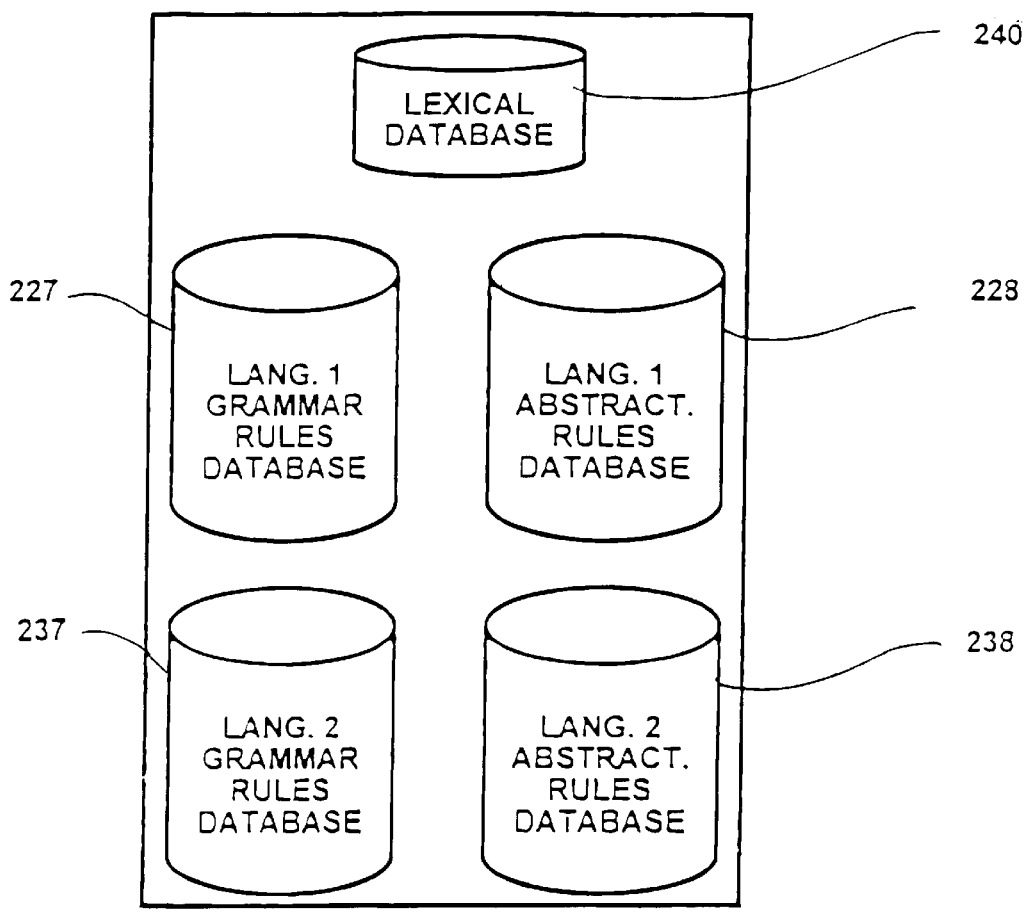
FIG. 6 is a block diagram showing the databases maintained within the server of FIG. 1.

Referring to FIG. 6, the server 200 stores data for use by the parser and abstractor in each language. This data comprises, for each language, a grammar rules database (227, 237) and an abstraction rules database (228, 238). Also present is a multilingual lexical database 240. The lexical database 240 stores an entry for each word in any language represented within the translator program, the entry stating the languages within which that word exists, and giving, for each of those languages, the text in the language concerned; the type of lexical element represented by the word (e.g. whether it is a noun, a verb, a pronoun, an adjective and so on); data on the manner in which the word is inflected, if at all, in each language, and various other data.

The grammar rules stored within each grammar rules database (227, 237) represent, for the corresponding language, the ways in which words of that language may be combined. Accordingly, in English, one rule will indicate that a verb such as "to see" requires an object and a subject, and that in the active form the subject is the active participant or "agent" (the person who sees) and the object is the passive participant or "patient" (the thing which is seen). The abstraction rules will be discussed in greater detail below.

The operation of this embodiment will now be disclosed in greater detail with reference to FIGS. 7–11.

Figure 9:
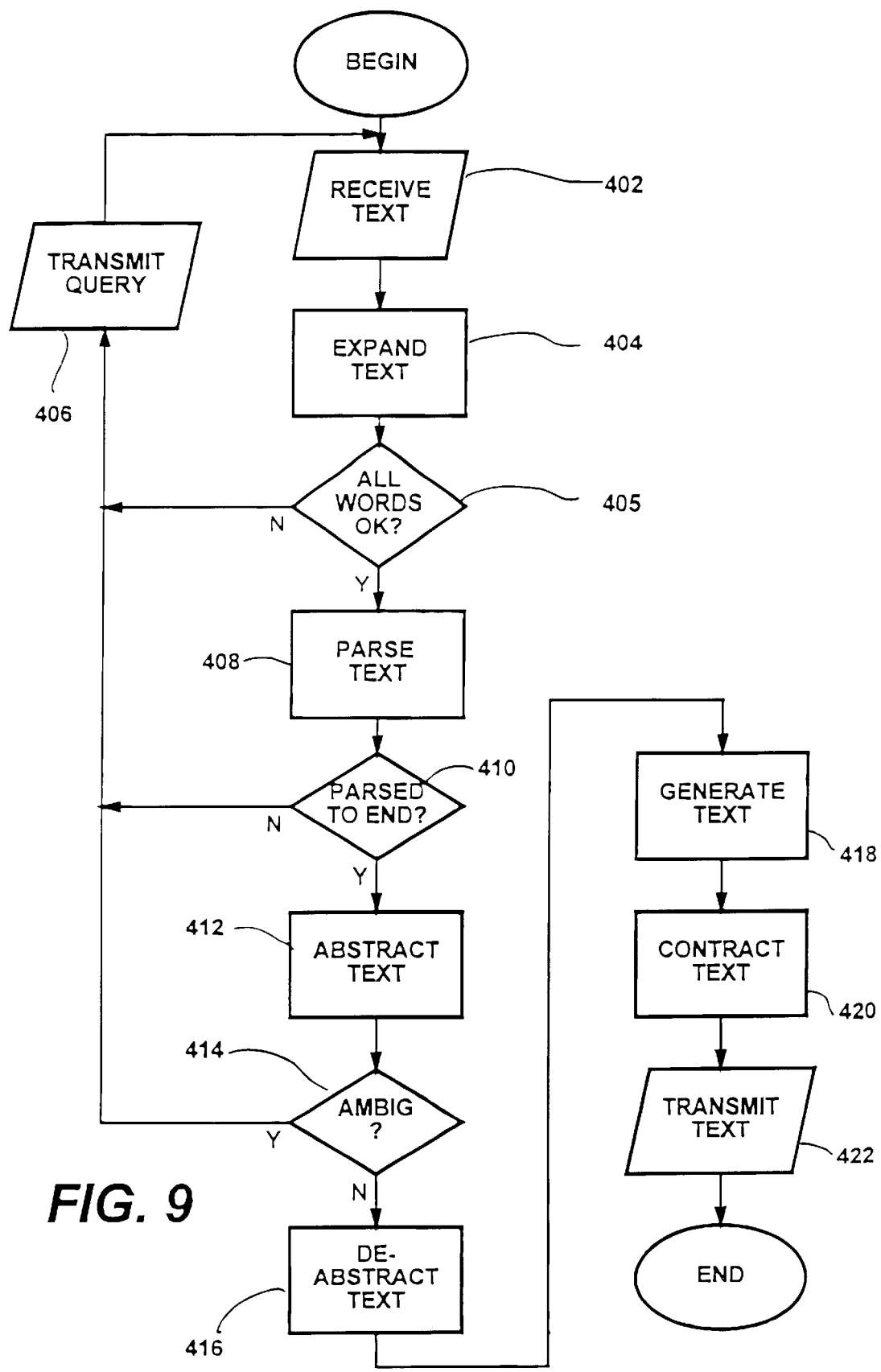
FIG. 9 is a flow diagram showing schematically the operation of the server of the embodiment of FIG. 1.

Referring to FIG. 9, in a step 402, text is received from the client terminal 100. In a step 404, the input text is expanded. As a first step, the start and end of each possible work in the text is located by detecting spaces and punctuation, so as to result in a stream of possible words. As a second step, any contracted words (such as "j'ai" in French") are expanded to replace them will full words (in that example, "je ai"). At the same time, the text processor locates and flags special text items such as proper names, dates, times, sums of money and so on.

At this stage, there may be several possible expanded strings of words that could match each contracted string of word. All such possibilities are retained as alternatives.

Next, each word is looked up in the lexical database 240, and words which are not recognised but are closely matched to others in the source language (that is, the language of the input text) are replaced by all those for which they are a close match, as in the manner of a conventional spell checker.

If, after spell checking, any words have note been recognised (step 405) then a query is transmitted back to the user, comprising a text message saying, for example, "The word (unrecognised word) has not been recognised. Please check the spelling, and resubmit this word or a synonym". This query is then transmitted to the client terminal 100 in step 406.

Figure 7:
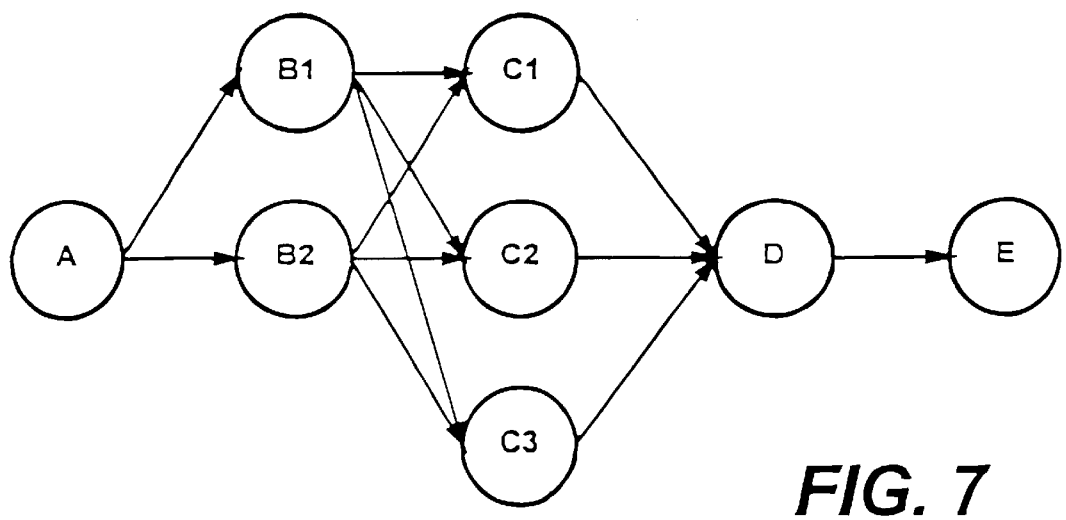
FIG. 7 is a schematic diagram illustrating the word structure produced after text pre-processing in the embodiment of FIG. 1.

The result of this pre-processing is therefore that the expanded text (stage B of FIG. 5) is no longer necessarily a linear sequence of words but may, as shown in FIG. 7, comprise a network or lattice of words.

FIG. 7 indicates such a network in which the second word, originally B, has been replaced by two possible alternatives (either alternative spellings or alternative expansions) B1 and B2, and the third word C has been replaced by three possible alternatives C1, C2 and C3. There are thus now six possible routes through the network of words.

The text of each word in the network is now replaced by a reference to the corresponding entry in the lexical database 240. If a single word (such as "bank" in English) has two different entries in the lexical database 240 corresponding to different meanings (which would be translated into different words in a target language), the word is replaced by each possible entry in the lexical database 240. For convenience, rather than using references to the entries in the lexical database, the syntactic category information for each word (i.e. whether it is a noun, verb etc) may be retained within the network, and a table relating each network position to the corresponding entry in the lexical database 240 is separately stored for later use.

In looking up each source language word in the lexical database 240, further ambiguities may be generated.

For example, English contains a generic word for "nut", whereas French uses several more specific words. The lexical database 240 contains the generic entry for the entity "nut", with a record of the English word for that entity. No French word exists. For each specific kind of nut, there is another entry. For example, the entry for "walnut" has both English and French equivalent specific words. However, since the English generic word "nut" can also refer to a walnut, another entry exists for the entity "walnut", giving the English word "nut" as the English translation. The same is true for each other specific type of nut. As each of these entries only exists because of the absence of a generic word for "nut" in French (which would be a direct translation of the English word), each is noted to be relevant when French is a target language.

On each such occasion where a single word in the source language is given as the translation of several different lexical entities in the database 240 (corresponding to several different words in one or more of the target languages), a reference to each of these is included within the processed text lattice of FIG. 7. Thus, in the above example, when the English word "nut" is encountered, it is replaced by separate nodes for each entry in the lexical database 240.

The present invention is intended to enable to translation into multiple different target languages, and it is apparent that the number of ambiguities that are thus generated could be substantial. Each ambiguity according to the present invention is resolved either by discounting possible alternatives as implausible (for example by contextual analysis using a database of contextual rules) or by a query to the user to ask him which meaning was intended.

For example, imagine that a document including the word "snow" in English is to be translated into a notional language which has three different words for snow; a first word meaning hard snow, a second word meaning soft snow and a third word meaning snow in general. The source language parser detects the three different entries in the lexical database 240 for the different meanings for the word snow, each of which refers to the English word snow as its translation in English. The query generated comprises text such as "Please indicate which of the following you mean:

soft snow
hard snow
any snow."

This text is passed to the server program 214 which sends it as a hypertext form, including areas for selection by the user, to the client terminal 100, at which the browser 114 displays it. The user then selects the desired meaning, and the form is returned by the browser 114 to the server 200 and passed to the parser, which reads the intended meaning and includes the corresponding lexical item in the subsequent processing stages.

On the other hand, if a given user requires a translation only into one or more target languages which are as unambiguous as the source language, then this step of ambiguity resolution will have been unnecessarily burdensome to the user.

For example, if it is desired to translate text including the word "nut" from English to German, the fact that the text would be ambiguous in an interlingual representation directly translatable into other languages (for instance into French), by the retention of the word "nut", is no burden to translation into German, where a generic term for "nut" ("nuβ") also exists, which is therefore a direct translation of the English word.

Accordingly, in this embodiment the target languages for translation are specified by input by the user at the client terminal 100, and sent to the server 200 at the outset. Thereafter, only those entries in the lexical database which exist in the source and all actual target languages into which the text are to be translated are referred to.

Next, the network of nodes (each corresponding, as noted above, to one of the entries in the lexical database 240 and being represented by the syntactic category of that entry) is processed by the source language parser program, which, for each word. applies the rules within the grammar rules database 227 which are applicable to words of that type.

Figure 8:
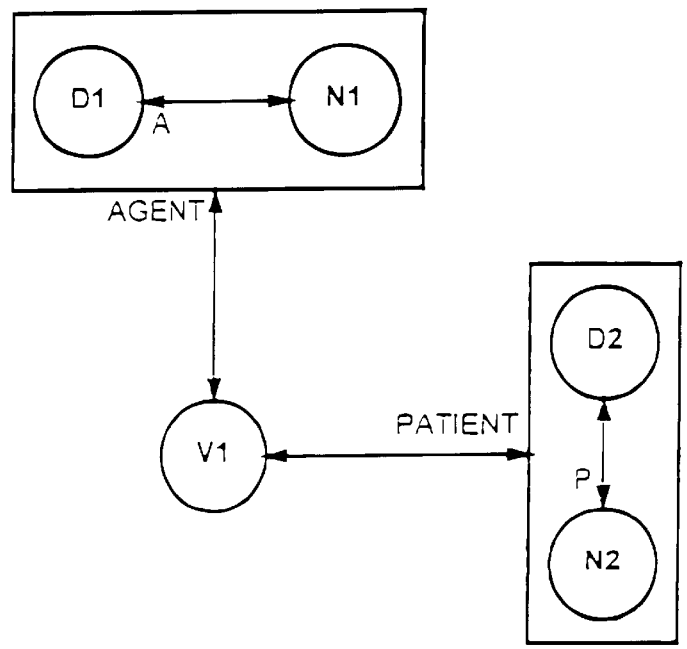
FIG. 8 is a diagram illustrating the entity/relationship semantic structure produced after parsing in the embodiment of FIG. 1.

Thus, for example, referring to FIG. 8, suppose that the English text contained the phrase "the dog saw the cat". The word "the" is the definite article, and a rule within the grammar rules database 227 indicates that it can be followed by the noun to which it refers. Thus, the circle D1 indicating the first occurrence of determiner "the" is linked by this rule to the next circle N1, representing the following noun "dog", and the circle D2, representing the second occurrence of determiner "the" is linked by this rule to the circle N2 for the following word, which is the noun "cat".

The rule for the active form of the verb "to see" indicates that the verb may be preceded by the seeing "agent" entity (in this case "the dog") and followed by the patient entity (in this case "the cat").

Thus, after parsing, the parsed semantic structure (stage C of FIG. 5) is represented, for each sentence of the input text, by one or more structures comprising references to entries in the lexical database 240 (the circles in FIG. 8) and pointers linking them together (the lines in FIG. 8). In the PROLOG computer language, the topological structure of FIG. 8 may be represented as

[
    A^det(def,s,_,third),A^e(dog,[ ]),P^det(def,s,_,third),
        P^e(cat,[ ]),
    E^event(see,fin,past,[ ]),E^A^r (agent,[ ]),E^P^r
        (patient,[ ])
]

In the foregoing, it will be noted that the unifying variables A and P are the links which unify the first occurrence of "the" with "dog" and the second occurrence of "the" with "cat". The verb "see" is linked by an agent relationship and a patient relationship with the terms linked by the relationship A (i.e. "the dog") and the terms linked by the relationship P (i.e. "the cat").

The verb is recorded as an event ("event"), and is linked to the lexical entry in the lexical database 240 for the word "see" and is indicated to be the finite form ("fin") in the past tense ("past").

The word "the" is recorded as a determiner, being the definite article ("def"), single rather than plural form ("s"), having neutral gender ("_") and referring to the third person ("third"). The terms for "dog" and "cat" are indicated to be entities ("e"), and have a reference to the corresponding word entry in the lexical database 240.

Thus far, other than the target-language dependency, the parser is not dissimilar to known, technically and commercially available products. Further information on suitable chart-parsing techniques which may be used will be found in James Allen, "Natural Language Understanding", 2nd Edition, Benjamin Cummings Publications Inc, 1995.

Two respects in which the operation of the parser differs from conventional parsers will now be described with reference to FIGS. 10 and 11.

Figure 10:
FIG. 10 is a diagram illustrating a phrase operated upon by the parser of the server of FIG. 1.

FIG. 10 illustrates the structure of a phrase such as "the big red bus" in English, consisting of a determiner (D1), followed by two adjectives (A1, A2), followed by a noun (N1) to which the adjectives refer (i.e. which they modify). During subsequent generation in the target language, it would be possible to produce parsed structures corresponding to all of the "the bus", "the big bus", "the red bus", "the big red bus" and "the red big bus".

Only the last two of these would ultimately be accepted as possibilities, since the others would leave redundant adjectives unaccounted for. However, a chart-parser-type generator would generate structures for each of the five possibilities which would, if embedded in a lengthy sentence, lead to a loss of processing speed whilst each possibility was evaluated, even though ultimately only the last two would lead to generated text. Furthermore, one of the two possibilities loses something of the meaning of the original text, since in English the first adjective modifies those which follow.

In the PROLOG language, the semantic structure created by the parser for the phrase "the big red bus" may be represented by:

[
    X^det(def,s,_,third),X^e(bus,[x,x]),
    X^V1^r(has Value,[a,x]), V1^e(red,[ ]),
    X^V2^r(has Value,[a]), V2^e (big,[ ])
]

It will be noted that the four words are linked by a relationship variable X. It will further be noted that the term for the entity "bus" contained a list including two entries.

This indicates that two modifiers (i.e. adjectives in this case) have been attached to the noun "bus". This explicit indication of the number of modifiers attached allows the generator in each target language only to generate those structures which contain the necessary number of modifiers, thus reducing the processing time required.

The term "big" is unified, by the variable V2, with a relationship term which is unified, by the variable X, with "the bus". The relationship term indicates that the bus has an attribute, the value of which is "big".

It is similarly linked by a relationship to the entity term for "red". It will be noted that the relationship terms linking the entity "bus" to the entities "big" and "red" differ; the additional "x" in the relationship term linking "bus" with "red" indicates that this is the second occurring (in the input text) of the two modifiers, and that an additional modifier "big" has yet to the attached.

Thus, in this embodiment the parser records the number and order of occurrence in the input text of multiple modifiers of an entity. Thus, the generator in each target language is able to reconstruct the translated equivalent of "the big red bus" preserving the number of modifiers, and putting them in an appropriate order of occurrence to achieve, in the target language, the same effect as their original order in the source language input text.

The significance of the term "a" in the two relationship terms above will now be discussed with reference to FIG. 11.

Many modifiers (words or clauses) can occur in different positions; for example, before or after the noun which they modify. In French, for example. the normal position of an adjective is after the noun which it modifies. An adjective may be employed before the noun which it modifies, which usually indicates that the modifier is being stressed, and gives it more subjective importance. For example, the phrase "un homme grand" in French has a different meaning to the phrase "un grand homme".

In the parser according to the present invention, for each modifier, in languages where that modifier can have multiple positions with differing emphases, at least a "normal" and a "stressed" positions are defined. The parser is arranged to detect the position of occurrence of a modifier in input text, relative to the entity (e.g. noun or verb) which it modifies, and to record this within the relationship terms making up the semantic structure it produces. In this embodiment, the fact that the modifier is in its normal position is recorded by the term "a", and a stressed position is recorded by the term "b".

Figure 11A:
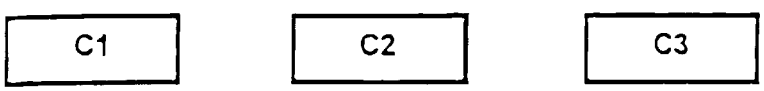
FIGS. 11a and 11b illustrate two alternative word orders which are discriminated by the parser of the embodiment of FIG. 1.

Thus, in FIG. 11a, the phrase "there is a swing in the park" is shown; term C1 refers to the event "there is"; term C2 refers to the phrase "a swing" and phrase C3 refers to the adverbial phrase "in the park". This adverbial phrase is in its default or unstressed position, for sentences of this type, following the noun "swing".

Figure 11B:
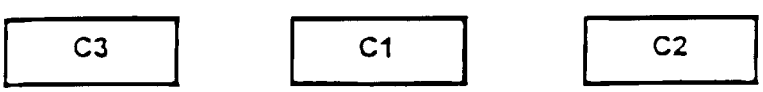

On the other hand, in FIG. 11b, the phrase "in the park there is a swing" is illustrated; in this case, the adverbial phrase comes first, with the emphasis thereby being shifted away from the location of the swing and towards the existence of the swing.

Accordingly, these two sentences (which would otherwise give rise to identical entity/relationship semantic structures as shown in FIG. 8) are distinguished by the value of the default position argument, which forms part of the relationship term by which the modifier is linked to the noun or other entity which it modifies. This argument is "a" in FIG. 11a (to indicate the default position of the modifier) and "b" in FIG. 11b (to indicate the stressed position).

The generator in each target language is therefore able, where the target language also includes a mechanism for putting stress on modifiers, to place the modifier in the stressed position in the target language where necessary, even though this position may be different to its position in the source language.

The target language generator may, where the target language indicates stress other than by position (for example by inflection), use the stressed location argument to correspondingly translate the modifier. For example, the French word "grand" may be translated in English as "great" if placed in one position or "tall" if placed in another. The manner in which the stressed position information is utilised will therefore vary with target language.

Having thus parsed the text (step 410), the abstractor 223 then accesses the abstracting rules database 228 to locate those source language phrases which may give rise to translation difficulties. The abstraction process is recursive, insofar as once one abstraction rule has been applied to the parsed text, the entire set of abstraction rules is referred to again when processing the partially abstracted text to identify another abstraction rule to be applied, repetitively until none of the abstraction rules in the set can be applied.

According to this embodiment, a first category of abstraction rules relate to the use of verb forms, which are often particularly difficult to translate. For example, English is unusual in that non-stative verbs (i.e. those which do not indicate the state of something, such as the verb "to go") are represented by the progressive form (e.g. "I am going", rather than "I go").

Accordingly, one abstraction rule in the English language abstraction rules database indicates that a progressive verb form should be replaced by its non-progressive equivalent (e.g. "I go"), for consistency with other languages in which that form is more normally used.

Likewise, in French, the reflexive form of the verb is often used in situations which have little inherently reflexive character. Thus, for example, the French verb "s'asseoire" is processed by an abstraction rule which replaces "I sit myself", for example, with "I sit" (the non-reflexive form).

Other rules, rather than operating on all verb forms, detect specific semantic substructures corresponding to source language idiom phrases within the input text . There is in the present embodiment, for example, a rule to detect occurrence of the semantic substructure corresponding to "my name is" and indicate a more general form (corresponding to "Ich heiβe" in German), which is more directly translatable.

Some rules within the abstraction rules database are associated with conditional tests, so that the rule is only valid if the conditional test is met.

The abstraction rule for French reflexive verbs written in the PROLOG language is:

abstract(
 [E^event(sit_refl,Vform,Tense,Proj),E^A^r(agent,_),
  A^reflex(_P,_N,_G)],
 [E^event(sit,Vform,Tense,Proj),E^A^r(agent,_)]).

In this rule, the second line is the abstracted, or interlingual form of structure for the first line (which indicates the reflexive form of the verb "to sit").

Likewise, a rule for abstracting the present tense of an English verb would be:

abstract(
 [E^aux(be,fin,pres),E^event,presp,_Tense,Proj)],
 [E^event(Event,pres,prog,Proj)],
 \+(Event ako stative)
).

This rule determines whether the verb is stative or not (the third line of the rule defines the conditional test) and, if not, substitutes the simple present tense (e.g. "I go") form for the progressive (e.g. "I am going") form.

Thus, in step 412, the abstractor 223 tests each structure generated by the parser, and where one or more of the abstraction rules is applicable, converts the detected structure to the alternative form recorded within the rule. As explained, this test is recursive such that the same rule may be applied at different stages of an abstraction process in which a structure generated by the parser is converted to the interlingual structure.

After operation of the abstractor, the ideal result should be a single, complete interlingual structure. If the structure is incomplete (that is to say, it was not possible to relate together all the words using the grammar and the abstraction rules) then successful translation will not be possible. If more than one possible structure is produced, then the input text is considered ambiguous since it could result in more than one possible translation in at least one of the target languages. If either of these conditions is met (step 414), a query is transmitted to the user (step 406).

In greater detail, the problematic points within the semantic structure, corresponding to incomplete or ambiguous meanings, are located, and the portions of the input text relating to these are formulated into a message and transmitted back to the user for display and response by the applet 116, with a query text which may for example say "the following text has not been understood/is ambiguous."

In a preferred version of the present embodiment, the de-abstractor and generator 224, 225 corresponding to the input (source) language are employed (as described in greater detail below) to generate a source language text for each possible semantic structure where two or more exist, and the query also includes these texts, prefixed with a statement "one of the following meanings may be intended, please indicate which is applicable:"

In this case, the message transmitted to the user in step 406 comprises a form, with control areas which may be selected by the user at the client terminal 100a to indicate an intended meaning for the ambiguous words or phrases detected within the input text.

In other embodiments, the translator may also include additional knowledge on the meanings of the words used, which will permit some possible semantic structures to be rejected as implausible.

For example, in Japanese, where different counting systems are used to represent different types of object, the entry in the lexical database for each object may indicate what kind of object it is (person thing and so on) and the translator will thereby be able to reject structures which count in the wrong arithmetic for the type of object concerned.

If no such ambiguities are detected, or after all such ambiguities are resolved (step 414), the single, unified, interlingual semantic structure produced by the abstractor 223 is then passed to the target language deabstractor 234 for the or each target language into which the text is to be translated. The de-abstractor 234 accesses the abstracting rules database 238 and, on detection of any of the substituted forms (for example "I sit") substitutes the normal form for the target language (in this case, "I sit myself" in French or "I am sitting" in English). The de-abstracted structure is then more idiomatically correct in the target language than was the semantic structure produced by the parser.

Next, in step 418, the target language generator program 235 accesses the target language grammar rule database 217 and the lexical database 240 and operates upon the de-abstracted semantic structure to generate output target language text.

The operation of the generator is essentially the reverse of that of the parser; briefly stated, it operates a chart-parsing algorithm (of a type known of itself) to take the components of the target language semantic structure generated by the de-abstractor, look up the applicable rules in the target language rules database 237, and assemble the corresponding words located from the lexical database 240 into a string of text ordered in accordance with the grammar rules, until a single stream of text which utilises all components of the semantic structure and obeys the grammatical rules is located.

On encountering a noun or other entity with other multiple modifiers, as noted above, the relevant entry in the lexical database 240 for each modifier is consulted to determine its default and stress positions, and each modifier is placed in the appropriate position. Where multiple modifiers are present in order, they are reproduced in an order appropriate to the target language, using the stored order data recorded by the parser. During iteration no structures which do not use all modifiers are generated.

After generating the output text stream, the text is post processed (step 420) to add a space before each word; capitalise the first letter in a sentence; add a full stop after the last word; contract any phrases (such as "je ai") which are capable of contraction; and reproduce any special forms of text (such as dates, amounts of money, and personal names), as appropriate for the target language.

The resulting formatted text is then formulated into an HTML page, which is transmitted back to the user at the client terminal 100a in step 422.

On receipt of the translation result at the client terminal 100a, the page is displayed via the browser 114 and may be converted and stored for subsequent word-processing by the user.

Second Embodiment

In the embodiment described above, the text for translation was returned to the user. In this embodiment, a multilingual communications system is provided.

Figure 12:
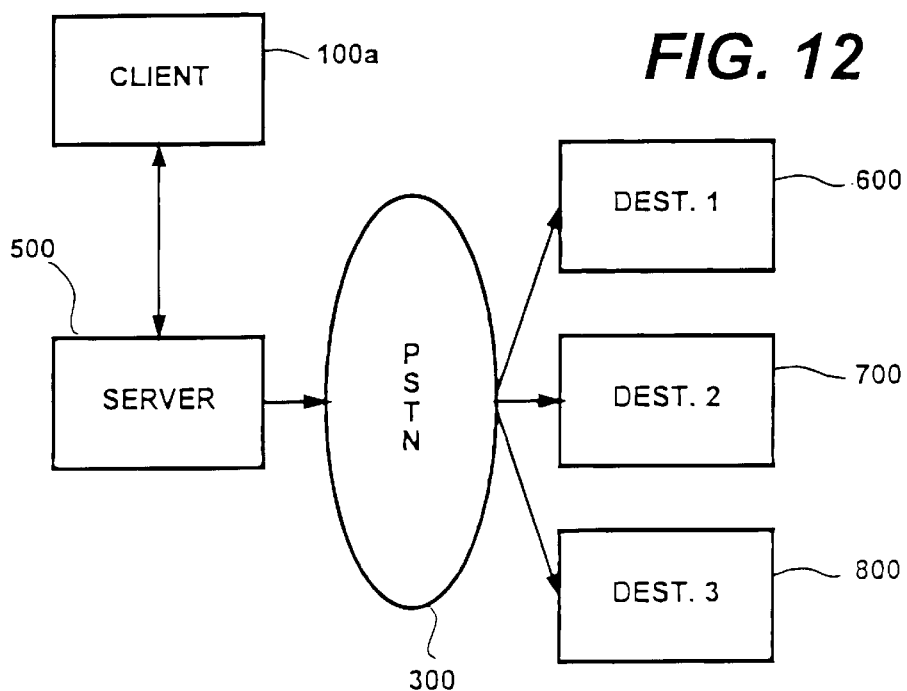
FIG. 12 is a block diagram of the language translation apparatus according to the second embodiment of the invention.

Referring to FIG. 12, the communications system comprises a client terminal 100a similar to the terminal 100 of the first embodiment, connected to a server 500 (either directly or via a communications network as in the first embodiment). The server 500 is then interconnected via the network 300 such as the PSTN or the Internet to a plurality of destination terminals 600, 700, 800.

Thus, in this embodiment, the client terminal 100a does not need, and does not have, the facility to receive the translated text itself.

Figure 13:
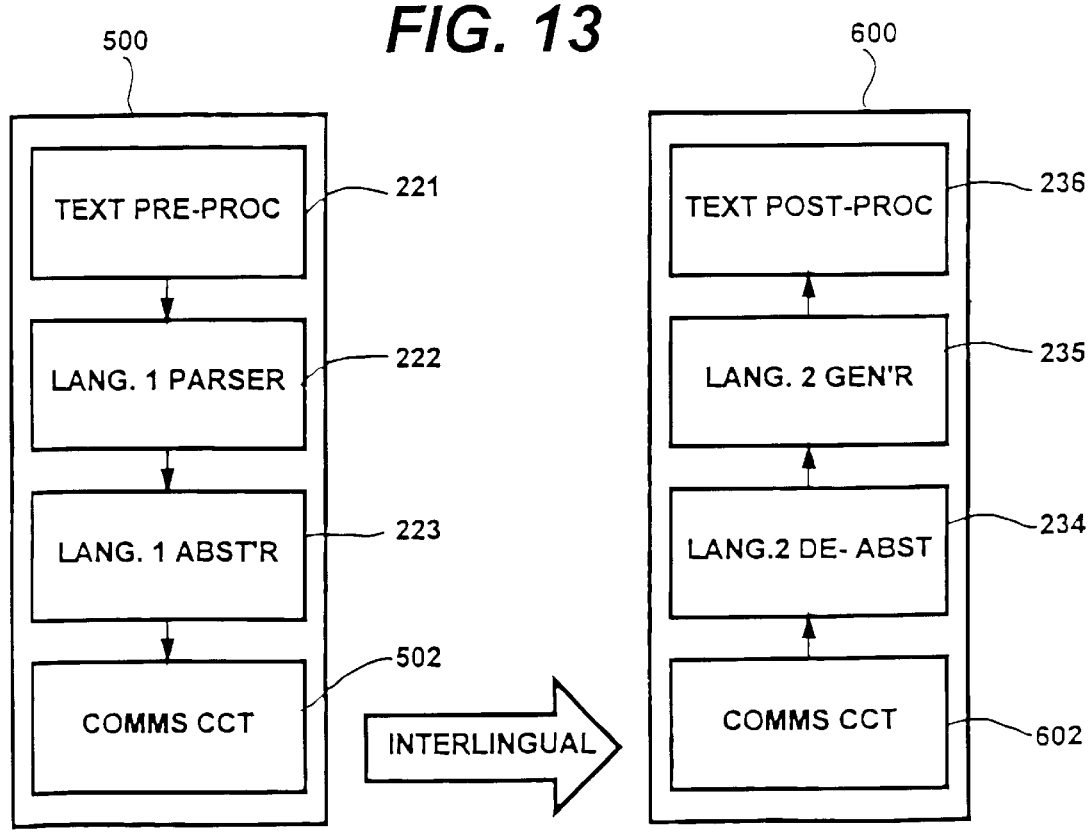
FIG. 13 is a block diagram showing the processes present in server and destination terminal components of the second embodiment of FIG. 12.

In this embodiment, as shown in FIG. 13, the server 500 now contains the text pre-processor 221, source language parser 222, and source language abstractor 223, together with operating system and server program components 212, 214 as before (not shown), but does not contain the abstractor, generator or text post processor elements for any of the target languages. Instead, these are present in each of the destination terminals 600, 700, 800 (only 600 is shown in FIG. 13). Also present in the server 500 is a communications circuit 502 and associated control program for transmitting e-mail messages, and in each of the destination terminals 600–800 a corresponding communications circuit (e.g. 602) and associated control program for receiving e-mail messages is provided.

In operation, this embodiment works as described above in relation to the first, but with the following modifications.

It is envisaged that the target language software would be widely distributed (for example, available for downloading free) and that the target language terminals would be personal computers or workstations. On the other hand, access to the source language components would be controlled; for example, by restricted access to the server 500 with payment mechanism.

Initially, instead of merely specifying the target language or languages in which the translation is to be supplied, the user of the client terminal 100a would be requested to supply e-mail addresses and target languages of the intended recipients of the translated text. This is conveniently achieved by arranging for the server to transmit an HTML form to the client terminal 100a with spaces for the relevant entries.

The client 100a and server 500 then perform steps 402–414 of the process of FIG. 9, with dialogue if necessary between the server and the user via the client terminal 100a to clarify any ambiguities in the input text. Upon completion of these steps, the resulting abstracted (interlingual) semantic structure is then transmitted as an e-mail message to each of the destination terminals 600–800. The volume of data to represent the abstracted (interlingual) semantic structure is found to correspond approximately to that of the source text.

Each of the destination terminals 600–800 then performs steps 416–420 of FIG. 9 to generate output text files, which are then stored as a received e-mail message, for subsequent processing or reading.

To give an example, a multinational company may wish to communicate with a group employees or contractors in Japan, France and Russia from the UK. The UK author specifies the e-mail addresses and the three languages Japanese, French and Russian as target languages, and types in input text in English at the terminal 100a, which is abstracted at server 500. The interlingual structure is transmitted to destination terminal 600 in France, destination terminal 700 in Japan and destination terminal 800 in Russia.

Destination terminal 600 has a target language de-abstractor, generator and post-processor software for French; terminal 700 for Japanese and terminal 800 for Russian. The received e-mail message at each of these destination terminals is regenerated into the relevant target language, to enable each user to review its contents in his own language.

Since it is only necessary to transmit a single message with the same content to each of the destination terminals, where there are a large number of recipients it is possible to send one message across long distances and then distribute it locally at the destination end, thus reducing long distance traffic over the situation where a separately translated copy of the message was sent to each different recipient.

Transmission is also simplified since it is not necessary to sort messages in different languages by their recipient, as the data transmitted is the same for each recipient.

Finally, no matter how many languages are added to the system, the server 500 and each destination terminal 600–800 do not need to store multiple language sets of parser/abstractor/de-abstractor/generator software for every possible language, as is the case in the first embodiment; it is only necessary for each to store software relating to a single language. Further, the volume of data occupied by the lexical database 240 may be reduced by holding, for each client terminal 100a, only the source language records for each entry and not the target language entries. The effect of increasing the number of languages is merely to (somewhat) increase the number of the abstraction rules.

It therefore becomes possible, in this embodiment, to merge the functions of the server 500 and client terminal 100a, permitting the functions of the server 500 to be performed on a terminal 100a comprising a personal computer or workstation, for example.

It will be seen that the various improvements described herein contribute to providing a translation system suited to modern telecommunications in particular, since in some aspects the above embodiments reduce the amount of interaction needed by a user, whilst in other embodiments the processing time and resources required are reduced, and in yet other embodiments the quality of the translation is improved, whilst maintaining the possibility for translation into more than one (and preferably a large number) of target languages.

Although the above embodiments accept a text document, a speech recognition front-end is also possible, or an image scanner with optical character recognition could be employed.

Although the above described embodiments describe a translation system, in which the target language text is generated, it will be understood that it would be possible with advantage to utilise the interlingual language structure generated for other purposes; for example, to provide a natural language front end or input routine for control of a computer or other equipment. Accordingly, such other uses of some aspects of the invention are not excluded.

Although adaptation to the intended target languages by limiting the search within the lexical database 240 to those words occurring in the source and those target languages has been described, it will be realised that it would also be possible to limit the operation of the abstractor, and merely to utilise those abstraction rules which remove language dependency in the source language which is not also present in the intended target languages.

In this case, each abstraction rule would similarly include a reference to those languages for which it was necessary, and only the necessary rules for the intended target language(s) would be used. Such an embodiment may prove useful as the number of target languages increases.

The foregoing embodiments are merely examples of the invention and are not intended to be limiting, it being understood that many other alternatives and variants are possible within the scope of the invention. Protection is sought for any and all novel subject matter disclosed herein and combinations of such subject matter.

What is claimed is:

1. A method of language processing for use within a process for machine-translating a document from a source language to at least one target language, comprising the steps:

(1) parsing said document using grammar rules specific to said source language to derive a source language-specific semantic graph;

(2) applying to a semantic graph, initially said source language-specific semantic graph derived by step (1), a plurality of abstraction rules in sequence until a source language-specific subgraph thereof is detected which meets the requirements of a said abstraction rule;

(3) in response to that detection of such a subgraph, modifying the semantic graph in which that subgraph was detected by replacing that subgraph by an abstracted subgraph specified by the said abstraction rule;

(4) performing step (2) in respect of the modified semantic graph produced by step (3); and (5) cyclically repeating steps (2), (3) and (4) in respect of respective modified semantic graphs until step (2) fails to detect a said source language-specific subgraph, and thereupon deeming the current semantic graph to be language independent.

2. Apparatus for use within a system for translating a document from a source language to at least one target language, comprising:

means for parsing said document using grammar rules specific to said source language to derive a source language-specific semantic graph;

means for receiving a semantic graph, initially said source language-specific semantic graph derived by said parsing means, and applying thereto a plurality of abstraction rules in sequence until a source language-specific subgraph thereof is detected which meets the requirement of a said abstraction rule;

means responsive to the detection of such a subgraph to modify the semantic graph in which that subgraph was detected by replacing that subgraph by an abstracted subgraph specified by the said abstraction rule, and to supply said received semantic graph so modified to said rule applying means; and means for detecting when said rule applying means has applied all of said plurality of abstraction rules in sequence to a received semantic graph without any detection of a said source language-specific subgraph therein, the current semantic graph being deemed to be language-independent.

3. A method of language processing for use within a process for machine translating a document from a source language to at least one target language, comprising the steps:

(1) applying to a semantic graph, initially a language-independent semantic graph, a plurality of abstraction rules in sequence until a language-independent subgraph thereof is detected which meets the requirements of a said abstraction rule;

(2) in response to that detection of such a subgraph, modifying the semantic graph in which that subgraph was detected by replacing that subgraph by an abstracted subgraph specified by the said abstraction rule;

(3) performing step (1) in respect of the modified semantic graph produced by step (2); and (4) cyclically repeating steps (1), (2) and (3) in respect of respective modified semantic graphs until step (1) fails to detect a said language-independent subgraph, and thereupon deeming the current semantic graph to be target language-specific.

4. Apparatus for use within a system for translating a document from a source language to at least one target language, comprising:

target language-specific means for receiving a semantic graph and applying thereto a plurality of abstraction rules in sequence until a language-independent subgraph thereof is detected which meets the requirement of a said abstraction rule;

means responsive to the detection of such a subgraph to modify the semantic graph in which that subgraph was detected by replacing that subgraph by an abstracted subgraph specified by the said abstraction rule, and to supply said received semantic graph so modified to said rule applying means; and means for detecting when said rule applying means has applied all of said plurality of abstraction rules in sequence to a received semantic graph without any detection of a said language-independent subgraph therein, the current semantic graph being deemed to be target language-specific.

* * * * *